April 21, 1953  G. H. KELLER  2,635,858

FIN VIBRATION DAMPING MEANS

Filed March 31, 1950

INVENTOR.
GEORGE H. KELLER.
BY Victor D. Behn
ATTORNEY

Patented Apr. 21, 1953

2,635,858

UNITED STATES PATENT OFFICE 2,635,858

FIN VIBRATION DAMPING MEANS

George H. Keller, Fair Lawn, N. J., assignor to Curtiss-Wright Corporation, a corporation of Delaware Application March 31, 1950, Serial No. 153,267

10 Claims. (Cl. 257—261)

This invention relates to vibration damping means and is more particularly directed to means for damping vibration of fins projecting from a body which is to be heated or cooled as a result of the flow of a heat exchange fluid through the passages between the fins.

The cylinders of an air-cooled internal combustion engine are provided with a plurality of spaced fins projecting therefrom and between which relative cool air is caused to flow for cooling the engine. One of the problems encountered with such cooling fin structure is that engine vibration may induce destructive resonant vibrations of the fins. An object of the present invention comprises the provision of a novel and simple means of rubber-like material which can readily be installed between the fins for damping vibration of said fins. As herein used, the term "rubber-like material" is intended not only to include rubber but also elastomeric compounds as for example the so-called synthetic and silicone rubbers.

In accordance with the present invention, a member of rubber-like material is inserted under compression between each pair of fins whereby said members are effective to dampen vibrations of said fins. Each of said members has a portion projecting from one side into a hole in the adjacent fin for holding said member in position between said fins. In addition each of said members has a recess on its other side, said recess being at least as wide and at least as deep as said projecting portion whereby said member can readily be deformed by displacing said projecting portion into said recess thereby facilitating insertion of said member between and/or removal of said member from a pair of fins.

Other objects of the invention will become apparent upon reading the annexed detailed description in connection with the drawing in which.

Figure 1:
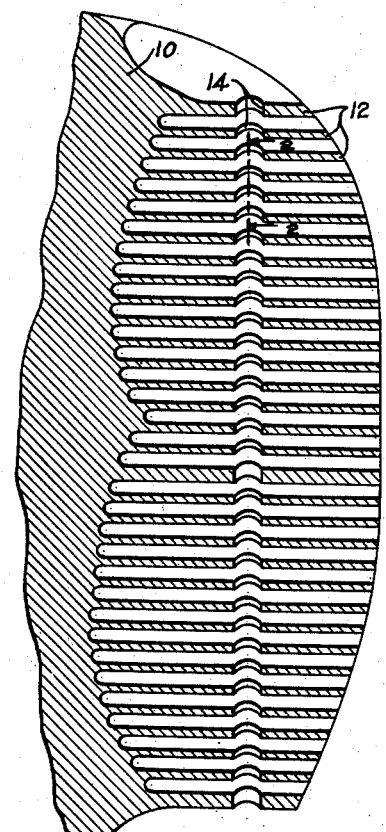
Figure 1 is a sectional view through a body having a plurality of heat exchange fins projecting therefrom, said fins having a series of axially alined holes therethrough.

Referring now to the drawing, a body 10, which may comprise a portion of a cylinder head of an internal combustion engine, is provided with a plurality of substantially parallel heat exchange fins 12 projecting therefrom and between which a heated fluid, as for example cooling air, is adapted to flow. In order to dampen vibration of the fins 12, they are provided with holes 14 extending therethrough inwardly of the outer edges of said fins. These holes may be provided by drilling through said fins as a unit structure thereby providing an axially alined series of holes as illustrated. A member 16 of rubber-like material is disposed between each pair of adjacent fins for damping vibration of said fins. Each rubber-like member 16 comprises a flat annular margin portion 18 with a central circular portion or button 20 projecting from one side of said member and adapted to extend into a fin hole 14 of the adjacent fin 12. The other side of each member 16 is provided with a circular recess 22 disposed concentric with and opposite to said projecting portion or button 20.

In its free condition, that is, in the absence of external forces other than gravity, the thickness of the annular flat margin 18 of each member 16 is larger than the width of the spaces between the fins into which said member is to be disposed. For example with the width of the space between the fins equal to 0.080", it has been found satisfactory to make the thickness of the flat margin 18 of each rubber 16 equal to 0.084". With these dimensions, the flat margin portion 18 of each member 16 is compressed when placed between a pair of fins whereby said member is effective to dampen vibration of said fins.

The diameter of each damper member button 20 should at least be slightly smaller than the diameter of the fin hole 14 into which said button is to extend in order that said button readily snaps into its fin hole when placed in alinement therewith. Obviously, if, as illustrated, the fin holes 14 are not perpendicular to the surfaces of their respective fins, this must be taken into account in order that the buttons 20 of the fin damper members 16 snap readily into said holes upon alinement therewith. For example with the arrangement illustrated if the fin holes 14 are drilled to a diameter of 0.205" it has been found satisfactory to make the diameter of each button 20 equal to 0.184".

The circular recess 22 of each rubber-like damper member 18 preferably has a diameter which is larger than the diameter of its associated projecting portion or button 20 and has a depth which is larger than the length or height of said projecting portion or button. For example with each button 20 having a height of 0.045" and, as stated above, a diameter of 0.184", it has been found satisfactory to make the depth and diameter of each recess 22 equal to 0.050" and 0.250" respectively. With these dimensions the button 20 of each damper member 16 can readily be displaced into its associated recess 22 whereupon said button does not interfere with insertion of said member between and/or removal of said member from between a pair of fins.

Each of the rubber-like damper members 16 is forceably inserted and pushed between a pair of fins by means of a suitable tool. When the button 20 of said damper member 16 comes into alinement with the hole 14 in the adjacent fin 12, said button immediately snaps into said hole to lock the damper member in position between said pair of fins. Thus each button 20 and cooperating fin hole 14 act as cooperating tongue and recess formations to restrain the damper members 16 against lateral movement relative to the fins. Since the margin portion 18 of each fin damper member 16 in its free condition, has a width larger than the width of the space between the fins in which said member is disposed, the margin portion 18 of each fin damper member 16 is in compression between its pair of adjacent fins whereby said members are effective to dampen vibrations of the fins. Each damper member 16 can be removed by a suitable hook adapted to be inserted between the fins and partly around said member. With such a hook, a damper member can readily be pulled out from between its pair of fins, the button 20 of said member being forced into a recess 22 of said member.

As illustrated the length or height of each button 20 is slightly less than the thickness of the fins 12. This button height has been determined by the depth of the associated recess 22, said height being made less than said depth in order that said button can readily be displaced into said recess. If, however, the space between the fins were larger than that illustrated in Figures 1 and 2 then the recess 22 could be made deeper and each button 20 could be made longer to such an extent that the button on one damper member projects into the recess of the adjacent damper member. Such an arrangement is illustrated in Figure 4.

Figure 2:
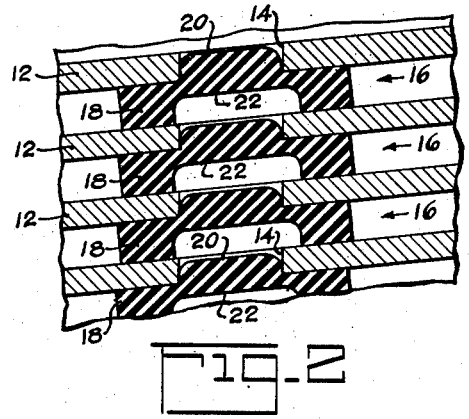
Figure 2 is an enlarged sectional view taken along line 2—2 of Figure 1 with the fin vibration damping means of the present invention installed in position between the fins.
Figure 3:
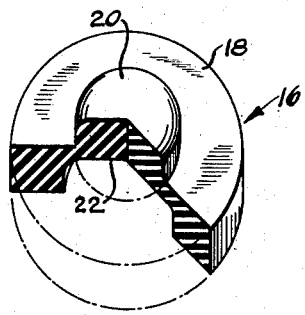
Figure 3 is a perspective view partly in section illustrating one of the fin vibration damping members.
Figure 4:
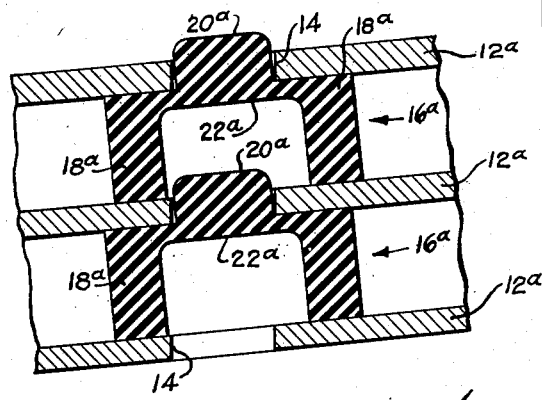
Figure 4 is a view similar to Figure 2 but of a modified construction.

In Figure 4, the fins are like those illustrated in Figures 1 and 2 except every other fin has been eliminated, the remaining fins being designated by reference character 12a and, like the fins 12, the fins 12a have holes 14 therethrough. Thus in Figure 4 the space between a pair of adjacent fins 12a is slightly more than twice the space between a pair of adjacent fins 12. Fin damper members 16a of rubber-like material are disposed in position between the fins 12a. The free thickness of each fin damper member margin portion 18a is larger than its associated inter-fin space whereby said margin portion is in compression when placed in position between a pair of fins 12a. As illustrated, the primary difference between the fin damper members 16a and 16 is that the button 20a of each fin damper member 16a is made longer than the buttons 20a of the damper member 16 so that each button 20a projects into the recess 22a of the adjacent fin damper member. With this arrangement of Figure 4 each fin damper member 16a is held in position not only by the interlocking engagement of its button 20a with the adjacent fin 12a but also by the interlocking engagement of said button with the adjacent fin damper member. Accordingly, with the arrangement of Figure 4 the fin damper members are more effectively locked in position between the adjacent fins.

As in the case of the damper members 16 the recess 22a of each fin damper member 16a may have a depth which is larger than the length of its associated button 20a so that said button can readily be displaced into said recess to facilitate removal and insertion of said fin damper member. However, if each damper member 16 or 16a is quite thick compared to the length of its button 20 or 20a, it may be possible to depress said button quite readily down to the surface of the adjacent margin portion 18 or 18a of said damper member even in the absence of any damper member recess 22 or 22a opposite to said button. If this is the case, the recess 22 or 22a of each damper member could be eliminated.

The damper members 16 and 16a provide a simple construction for damping vibration of the fins projecting from a heat exchange body. No modification of the fins is necessary except for drilling holes 14 in said fins and the damper members 16 can readily be installed and replaced. The margin portion 18 or 18a of each damper member can be made as wide as desired in order to provide sufficient area of contact with the adjacent fins so as to adequately dampen vibration of said fins.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination; a body having a pair of heat exchange fins projecting therefrom, one of said fins having a hole; and a member of rubber-like material having a first portion disposed in compression between said fins, said member having a second portion projecting from one side into said hole for holding said member in position between said fins.

2. In combination; a body having a pair of heat exchange fins projecting therefrom, one of said fins having a hole; and a member of rubber-like material having a first portion disposed in compression between said fins, said member having a second portion projecting from one side into said hole for holding said member in position between said fins, said member also having a recess on its other side opposite to said projecting portion, said recess being at least as large as said projecting portion whereby said member can readily be deformed by displacing said projecting portion into said recess to facilitate positioning of said member between said fins.

3. In combination; a body having a pair of heat exchange fins projecting therefrom, one of said fins having a hole; and a member of rubber-like material having a margin portion disposed in compression between said fins and having a central portion projecting from one side of said member into said hole.

4. In combination; a body having a pair of heat exchange fins projecting therefrom, one of said fins having a hole; and a member of rubber-like material having a flat margin portion disposed in compression between said fins and having a central portion projecting from one side of said member into said hole, said member also having a recess on its other side opposite said projecting portion.

5. In combination; a body having a pair of heat exchange fins projecting therefrom, one of said fins having a hole; and a member of rubber-like material having a margin portion disposed in compression between said fins and having a central portion projecting from one side of said member into said hole, said member also having a recess on its other side opposite to said projecting portion, said recess being at least as large as said projecting portion whereby said member can readily be deformed by displacing said projecting portion into said recess to facilitate positioning of said member between said fins.

6. In combination; a body having a plurality of heat exchange fins projecting therefrom, each of said fins having a hole therethrough co-axially alined with the corresponding holes in the adjacent fins; and a plurality of members of rubber-like material, one for each pair of adjacent fins, each of said members having a first portion disposed in compression between its associated pair of fins and having a second portion projecting from one side of said member into said hole in the fin adjacent to said side for releasably holding said member in position between said fins.

7. In combination; a body having a plurality of heat exchange fins projecting therefrom, each of said fins having a hole therethrough co-axially alined with the corresponding holes in the adjacent fins; and a plurality of members of rubber-like material, one for each pair of adjacent fins, each of said members having a first portion disposed in compression between its associated pair of fins and having a second portion projecting from one side of said member into said hole in the fin adjacent to said side for releasably holding said member in position between said fins, each of said members also having a recess disposed on its other side opposite to the projecting portion of said member and being at least as large as said projecting portion whereby said member can readily be deformed by displacing said projecting portion into said recess to facilitate positioning of said member between said fins.

8. In combination; a body having a plurality of heat exchange fins projecting therefrom, each of said fins having a hole therethrough co-axially alined with the corresponding holes in the adjacent fins; and a plurality of members of rubber-like material, one for each pair of adjacent fins, each of said members having a first portion disposed in compression between its associated pair of fins and having a second portion projecting from one side of said member into said hole in the fin adjacent to said side for releasably holding said member in position between said fins, each of said members also having a recess disposed on its other side opposite to the projecting portion of said member and each said projecting portion having a length sufficient to extend beyond the remote side of the adjacent fin into the recess of the adjacent rubber-like member.

9. In combination; a body having a plurality of heat exchange fins projecting therefrom, each of said fins having a hole therethrough co-axially alined with the corresponding holes in the adjacent fins; and a plurality of substantially co-axially disposed members of rubber-like material, one for each pair of adjacent fins, each of said members having a flat annular margin portion disposed in compression between its associated pair of fins and having a central portion projecting from one side of said member into said hole in the fin adjacent to said side for releasably holding said member in position between said fins.

10. In combination; a body having a plurality of heat exchange fins projecting therefrom, each of said fins having a hole therethrough co-axially alined with the corresponding holes in the adjacent fins; and a plurality of substantially co-axially disposed members of rubber-like material, one for each pair of adjacent fins, each of said members having a flat annular margin portion disposed in compression between its associated pair of fins and having a central portion projecting from one side of said member into said hole in the fin adjacent to said side for releasably holding said member in position between said fins, each of said members also having a recess disposed on its other side opposite to the projecting portion of said member and being at least as large as said projecting portion whereby said member can readily be deformed by displacing said projecting portion into said recess to facilitate positioning of said member between said fins.

GEORGE H. KELLER.

References Cited in the file of this patent

UNITED STATES PATENTS

| Number | Name | Date |
| --- | --- | --- |
| 1,899,324 | Griswold | Feb. 28, 1933 |
| 1,940,598 | Larkin | Dec. 19, 1933 |
| 2,396,363 | Du Bois et al. | Mar. 12, 1946 |
| 2,512,735 | Beier | June 27, 1950 |
| 2,518,675 | Francisco, Jr. | Aug. 15, 1950 |